(12) United States Patent
Oyama et al.

(10) Patent No.: US 6,527,833 B1
(45) Date of Patent: Mar. 4, 2003

(54) HYDROGEN-SELECTIVE SILICA BASED MEMBRANE

(75) Inventors: Ted S. Oyama, Blacksburg, VA (US); Anil K. Prabhu, West Palm Beach, FL (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 09/890,020

(22) PCT Filed: Jan. 31, 2000

(86) PCT No.: PCT/US00/02075
§ 371 (c)(1),
(2), (4) Date: Feb. 21, 2002

(87) PCT Pub. No.: WO00/45940
PCT Pub. Date: Aug. 10, 2000

Related U.S. Application Data

(60) Provisional application No. 60/118,433, filed on Feb. 2, 1999.

(51) Int. Cl.[7] .......................... B01D 53/22; B01D 71/04
(52) U.S. Cl. ................ 96/10; 96/11; 95/55; 427/249.2; 427/255.37
(58) Field of Search ........................... 95/55, 56; 96/10, 96/11; 427/249.2, 255.37

(56) References Cited

U.S. PATENT DOCUMENTS

| | | | | | |
|---|---|---|---|---|---|
| 4,482,360 A | * | 11/1984 | Taketomo et al. | | |
| 4,689,150 A | * | 8/1987 | Abe et al. | ............... | 210/490 |
| 4,902,307 A | * | 2/1990 | Gavalas et al. | ............... | 96/10 X |
| 5,250,184 A | * | 10/1993 | Maier | ............... | 210/653 |
| 5,415,891 A | * | 5/1995 | Liu et al. | ............... | 427/243 |
| 5,453,298 A | * | 9/1995 | Gavalas et al. | ............... | 96/10 X |
| 5,487,774 A | * | 1/1996 | Peterson et al. | ............... | 95/45 |
| 5,772,735 A | * | 6/1998 | Sehgal et al. | ............... | 96/10 X |
| 5,789,024 A | * | 8/1998 | Levy et al. | ............... | 96/11 X |
| 5,827,569 A | * | 10/1998 | Akiyama et al. | ............... | 96/11 X |
| 6,152,986 A | * | 11/2000 | Foller | ............... | 96/11 X |

FOREIGN PATENT DOCUMENTS

JP           61-238303 A   *  10/1986   ............... 96/11

* cited by examiner

Primary Examiner—Robert H. Spitzer
(74) Attorney, Agent, or Firm—Whitham, Curtis & Christofferson, P.C.

(57) ABSTRACT

A new type of silica-modified membrane has been developed by the high-temperature, atmospheric-pressure CVD of Vycor glass. The new membrane, Nanosil, showed unprecedented selectivity to hydrogen (100%), without loss of permeability compared to the porous Vycor precursor. The membrane also showed high stability under hydrothermal conditions over prolonged time. The suitability of a $Rh/Al_2O_3$ catalyst for the methane reforming with carbon dioxide was also demonstrated. The limitations imposed by thermodynamics on methane conversion have been circumvented by the use of membranes to preferentially remove hydrogen during reaction. The shortcoming of the Knudsen mode of diffusion was overcome by the development of the modified porous glass membrane.

20 Claims, 10 Drawing Sheets

HYDROGEN-SELECTIVE SILICA BASED MEMBRANE

This application claims the benefit of Provisional Application No. 60/118,433, filed Feb. 2, 1999.

BACKGROUND OF THE INVENTION

1. Field of the Invention

The present invention generally relates to hydrogen generation, purification, and recovery and, more particularly, to a method for preparing a porous glass membrane having selectivity for hydrogen while retaining permeability.

2. Background Description

Ceramic membranes are receiving considerable attention. Over the last ten years it has been demonstrated that membrane-based separation processes are commercially viable in a wide variety of applications. However, polymer-based membranes are used in the majority of these processes, and thus, there are inherent limitations in the operating temperatures and pressures that can be used. It is felt that ceramic-based membranes would offer significant improvements in the range of operating temperatures and pressures available. The question is how to make ceramic membranes with high selectivity and high permeability.

Several publications have appeared describing the use of porous glass tubes as separation media. The pore sizes that can be achieved are generally somewhat larger than molecular dimensions, thus, separation is based on Knudsen diffusion. This is not a very efficient separation mechanism. In an attempt to improve the performance of these porous glasses, a number of investigators have tried to deposit various types of materials in the pores under controlled conditions. The idea is to reduce the average pore size so that only hydrogen can pass through. While some success has been achieved, it usually comes at the expense of reduced permeability.

In recent years, increasing attention has been paid to global warming as a result of the release of greenhouse gases. The methane dry-reforming reaction (1)

$$CH_4 + CO_2 = 2CO + 2H_2 \Delta H°_{298} = 247 \text{ kJ mol}^{-1} \quad (1)$$

provides a pathway to convert carbon dioxide, a problematic greenhouse gas, and methane, a plentiful natural resource, into syngas (a mixture of $CO+H_2$). Syngas is an industrially important feedstock that can be commercially transformed into ethylene glycol, MTBE, acetic acid, oxo alcohols, diesel, ethylene and several other important chemicals.

Fischer and Tropsch (Die zusammensetzung der bei der erdölsynthese erhalten produkte, *Brennstoff Chem.* 2(9) (1928)21) were the first to propose the dry-reforming reaction for methane conversion to syngas. In recent years, many researchers have explored this route towards syngas production. The studies have concentrated mainly on noble metals and Ni catalysts on various supports, and the results have been mixed, with some reports of catalysts being active and stable for long periods of operation, while others of catalyst undergoing coking and deactivation. A consensus from these studies is that noble metal catalysts are usually resistant to coking (with Pt being an exception). For Ni catalysts however, only low loading catalysts had good activity without appreciable coking while high loading (>10% metal) catalysts usually deactivated due to coking. Wang, et al. (Carbon dioxide reforming of methane to produce synthesis gas over metal-supported catalysts: State of the Art, *Energy and Fuels* 10(1996) 896) have provided a comprehensive summary of many of the catalysts used in the carbon dioxide reforming of methane.

The conversion of methane in the fixed-bed mode of operation is limited by the reversibility of the reforming reaction. For such reversible reactions, preferential removal of one or more of the products during reaction will cause a shift in equilibrium, thereby overcoming thermodynamic limitations. Membranes can bring about such selective removal of species during reaction and hence reactors incorporating such membranes have been used to increase reaction yields. Membranes have also been used in applications where controlled introduction of reactant(s) is necessary to reduce hot spots in a catalyst bed or to avoid undesirable side reactions. Reactors incorporating membranes offer advantages over conventional fixed-bed reactors that include higher energy efficiency, lower capital and operating costs, compact modular construction, low maintenance cost, and ease of scale-up.

Some of the earliest studies on membrane reactor applications used noble metal membranes for several hydrogenation and dehydrogenation reactions, and high conversions together with good selectivity were reported. Use of a silver membrane in the oxidation of ethanol resulted in a 50% improvement over equilibrium. More recently, considerable work has been done with ceramic membranes. $H_2S$ decomposition studies have been conducted in a porous-glass membrane reactor resulting in selective separation of $H_2$ from the reacting mixture and conversions twice as high as equilibrium were reported. The dehydrogenation of cyclohexane in reactors using platinum impregnated Vycor (Vycor is a porous glass which is essentially borosilicate glass with boron removed, and is commercially available from a variety of sources including Corning), palladium, and porous glass membranes resulted in conversions 2.5 to 5 times higher than equilibrium conversion. In studies on the oxidative dehydrogenation of ethane and the dehydrocyclodimerization of propane using alumina and palladium-silver membranes respectively, results indicated no improvement in conversion but there was improved selectivity to products. The dehydrogenation of methanol and n-butane in alumina membrane reactors was studied with 50% improvement in conversions obtained in the membrane mode of operation as compared to the fixed-bed mode of operation. The methane steam reforming reaction in metal dispersed alumina membrane reactors has resulted in conversions twice as high as equilibrium. The same reaction in an alumina membrane reactor has provided conversions 20% higher than the equilibrium level.

Several studies have focused on the development of selective membranes that provide high selectivity by suitably modifying a porous ceramic support. Sol-gel processing and CVD have been the methods of choice by most researchers. Sol-gel modification provides good selectivity and permeability as opposed to CVD methods where there is an accompanying loss of permeability, though the selectivity is enhanced. The sol-gel method however, suffers from a lack of reproducibility.

The silica modified membranes developed by several researchers suffer from loss of permeability (as much as 50% or greater in the first 12 h) on exposure to moisture. This has been attributed to the removal of Si—OH groups leading to the formation of Si—O—Si bonds which close pore channels. This phenomenon is termed as densification. Moisture apparently catalyzes this reaction particularly at higher temperatures. Densification not only leads to lower permeability but also causes embrittlement of the silica film that compromises selectivity.

SUMMARY OF THE INVENTION

It is therefore an object of the invention to provide a membrane which is extremely selective to hydrogen which also maintains good permeability.

It is another object of the invention to provide an inorganic ceramic composition, which is stable at high temperatures, in the presence of steam, and under pressure.

According to the invention, a membrane, called Nanosil throughout this application, is formed by chemical vapor deposition (CVD) of tetraethyl orthosilicate (TEOS) at high temperature in the absence of oxygen or steam. This membrane has selectivities of 100% with respect to $CH_4$, CO, $CO_2$ and $H_2O$. The invention can be practiced with other silica precursors such as tetraethyl silicates, tetra isopropyl silicates, chloro-, dichloro-, and trichloromethylsilanes, and other silicon compounds. An important feature of the invention is that the silica precursor be decomposed in an inert atmosphere (lacking oxygen or steam). Decomposition can be accomplished by high temperature exposure, laser exposure, or other means.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The Nanosil membrane of the present invention is formed by the deposition of a thin layer of silica in the mouth of the pores of the porous glass substrate. The layer is sufficient to impede passage of species other than hydrogen to the pores.

Figure 1:
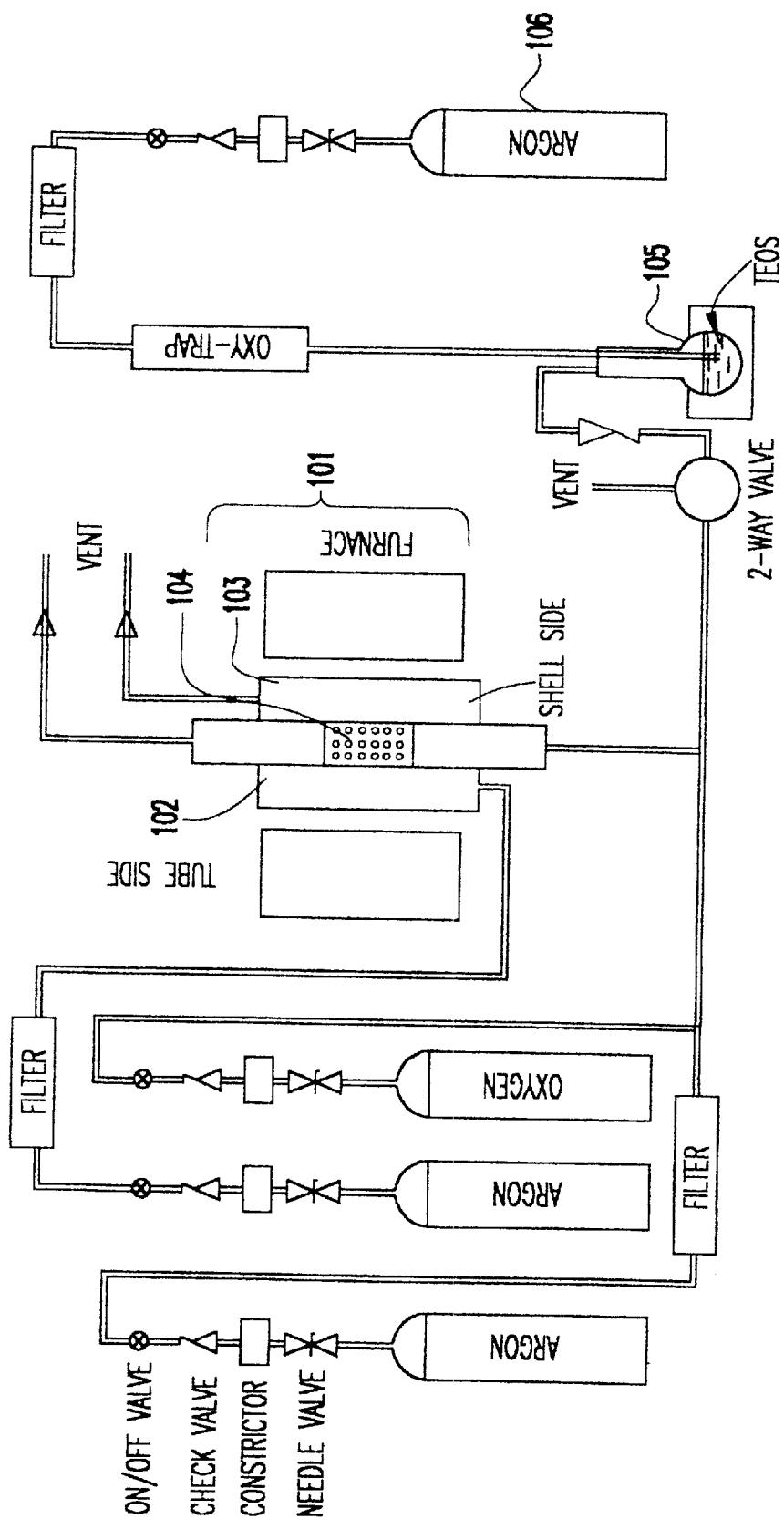
FIG. 1 is a schematic of the experimental apparatus as used in the preparation of the Nanosil membrane of the present invention.

The Nanosil membrane is prepared as follows: A porous substrate, in this case Vycor glass (Corning 7930 glass), is modified in the experimental setup as shown in FIG. 1. The reactor assembly 101 including tube 102 and shell 103 with a 4 cm porous glass (Vycor) section 104 is heated to 873 K with Ar flow on both the shell (20 $\mu$mol s$^{-1}$) and the tube (8 $\mu$mol s$^{-1}$) side. Tetraethyl orthosilicate 105 (TEOS, Aldrich, 98%) is introduced through a bubbler at 298 K using Ar 106 (3 $\mu$mol s$^{-1}$) as the carrier gas. The stream is premixed with the tube stream Ar before introduction in the tube side. The TEOS-Ar stream is allowed to flow for different time periods (12 h, 24 h, 48 h) after which the reactor is cooled in Ar.

The characteristics of the porous Vycor glass (Corning 7930 glass) are discussed below. The diffusion of gaseous species through the membrane is demonstrated to be predominantly by Knudsen diffusion. For this mode of diffusion, the permeability coefficient decreases as $T^{-\frac{1}{2}}$ and separation factors $\delta_{ij}$ between gases are proportional to the inverse square root of the ratio of masses, $$\sqrt{\left(\frac{Mj}{Mi}\right)}$$

For the porous glass sample, the experimental $H_2$ permeability coefficient $Q_{H2}$ was $4\times10^{-8}$ cm$^3$ cm$^{-2}$s$^{-1}$Pa$^{-1}$ at 873 K, which is typical for this material. Separation factors were obtained from individual permeability coefficients and are listed in Table 1 (for a temperature range 300–973 K). The separation factors obtained with the unmodified Vycor membrane were close to that predicted by the Knudsen equation and the temperature coefficient for diffusion was $T^{-0.56}$. A good match between the experimental and theoretical results strongly indicates that the mode of transport of all species was molecular.

TABLE 1

| Ratio | Knudsen selectivities | |
|---|---|---|
| | Theoretical | Experimental |
| $H_2/CH_4$ | 2.83 | 2.76 |
| $H_2/CO$ | 3.74 | 3.62 |
| $H_2/CO_2$ | 4.69 | 4.26 |

Figure 2:
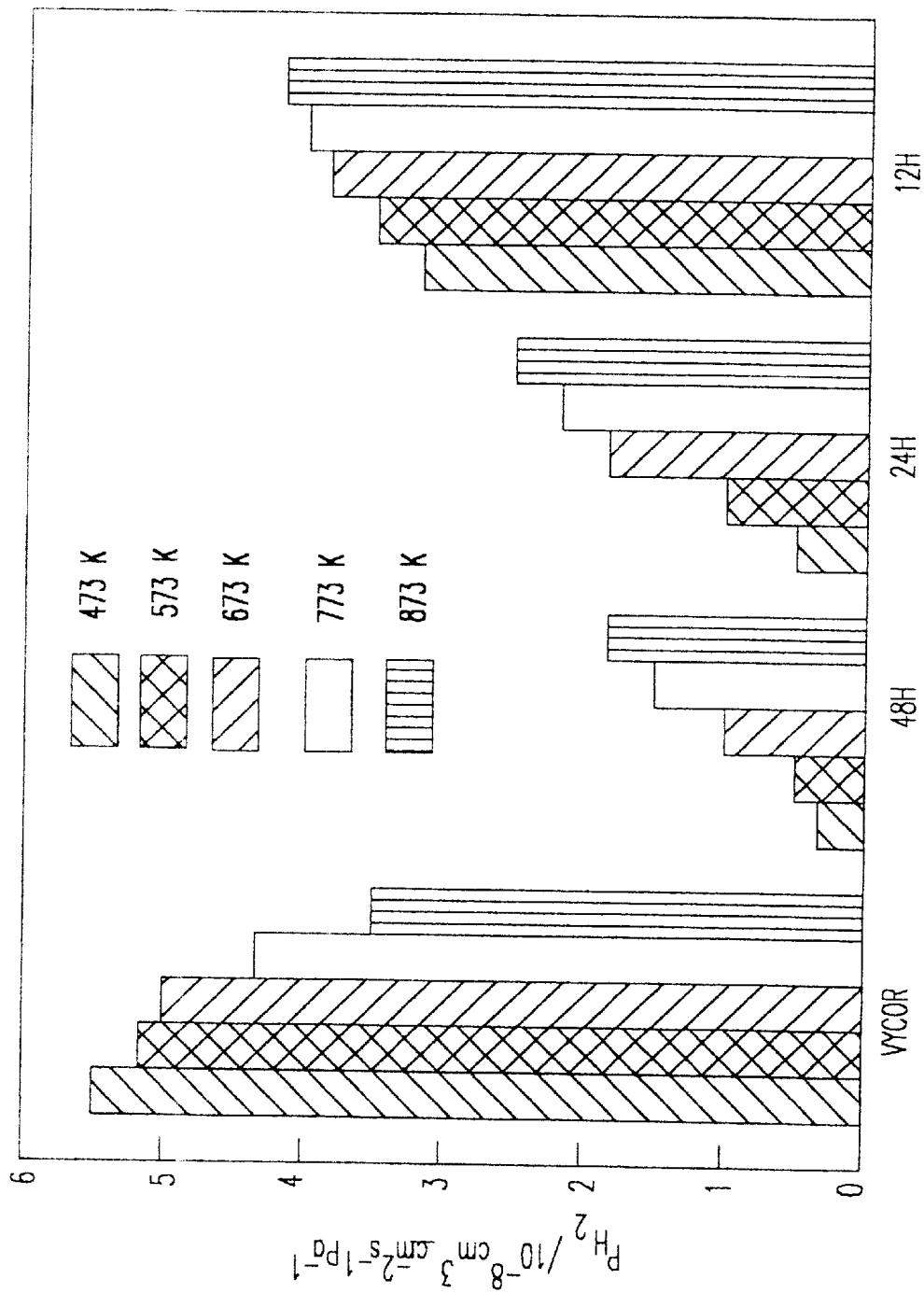
FIG. 2 is a bar graph comparing permeabilities of the untreated Vycor membrane to several Nanosil membranes.

The modified porous glass membrane was prepared by the chemical vapor deposition of TEOS at 873 K as described above. The deposition was conducted on different samples for 48, 24, and 12 h. FIG. 2 compares the permeabilities of these Nanosil membranes, subject of the present invention, with the original porous glass membrane. It is evident from the temperature dependency that the diffusion changed from Knudsen to an activated mode. The 48, and 24 h deposited membranes had lower permeability than the support Vycor material. However, the 12 h deposited membrane had permeability comparable to the support material. Table 2 compares the selectivities of the porous glass membrane with that of the 12 h membrane. The modified membrane offered unprecedented selectivity (100%) to hydrogen with $H_2/CH_4$, $H_2/CO$, and $H_2/CO_2$ separation factors of at least 27000, 87000, and 8200 respectively, while retaining a high permeability, comparable to the support material. In conclusion, the Nanosil membrane is completely different from the substrate material.

TABLE 2

Selectivity factors for porous glass and Nanosil membranes

| Temp (K) | $H_2/CH_4$ Glass theo | $H_2/CH_4$ Glass expt | $H_2/CH_4$ Nanosil | $H_2/CO$ Glass theo | $H_2/CO$ Glass expt | $H_2/CO$ Nanosil | $H_2/CO_2$ Glass theo | $H_2/CO_2$ Glass expt | $H_2/CO_2$ Nanosil |
|---|---|---|---|---|---|---|---|---|---|
| 473 | | | 23000 | | | 72000 | | | 6700 |
| 573 | | | 24000 | | | 76000 | | | 7400 |
| 773 | 2.83 | 2.76 | 27000 | 3.74 | 3.62 | 85000 | 4.69 | 4.26 | 8100 |
| 873 | | | 27000 | | | 87000 | | | 8200 |
| 973 | | | 27000 | | | 82000 | | | 7300 |

The mechanism of hydrogen transport was checked using isotope exchange experiments with $H_2$ and $D_2$.

Figure 3:
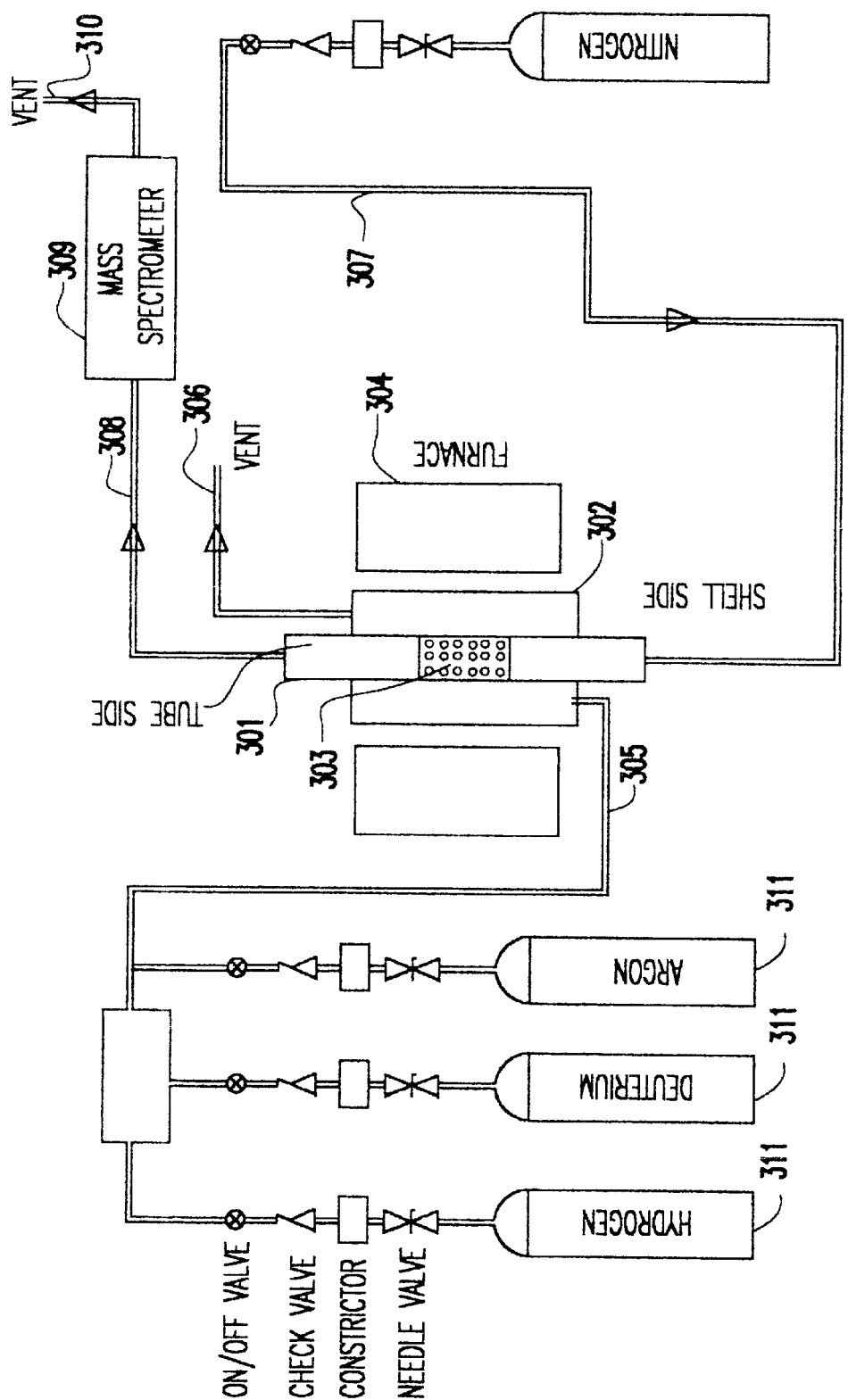
FIG. 3 is a schematic showing the experimental apparatus used for the isotopic exchange determinations.

FIG. 3 shows the experimental setup for the isotope exchange studies. As can be seen in FIG. 3, the experimental apparatus consists of concentric quartz tubes; the inner one hereinafter referred to as the tube 301 and the outer one referred to as the shell 302. The tube 301 incorporates the membrane subject of this invention 303. The tube 301 and shell 302 portion of the apparatus is within a furnace 304. The intake 305 to the shell 302 is connected to Ar, $D_2$, and $H_2$ supplies 311. The shell 302 also has a vent 306. The intake 307 to the tube 301 is connected to $N_2$. The outlet 308 of the tube 301 is connected to a mass spectrometer 309 which also has vent 310. The mass spectrometer 309 analyzes for the presence of gases which permeate the membrane 303. An equimolar mixture of $H_2$ and $D_2$ (5 $\mu$mol s$^{-1}$) premixed with Ar (7 $\mu$mol s$^{-1}$) was passed through the shell side of the reactor. $N_2$ (29 $\mu$mol s$^{-1}$) was used as the sweep gas on the tube side. A sample from the tube side was analyzed online using the mass spectrometer (Dycor) for masses 1, 2, 3, and 4. This as repeated for several temperatures. Table 3 lists the results of the studies with a hydrogen deuterium mixture. The top section shows the results of reference measurements carried out with the mesoporous Vycor glass membrane. The observation of mass 1 and mass 3 species in this case where only molecular hydrogen transport occurred was due to the fragmentation and recombination of hydrogen species in the mass spectrometer ionizer, and can be considered as a black level for these species. The bottom section summarizes the results for the Nanosil membrane. The most important result is that the ratio of mass 3/mass 4 is substantially above the blank level indicating that HD (mass 3) has been formed by passage through the membrane. Meanwhile the ratio mass 1/mass 2 remains substantially unchanged since any fragmentation of HD contributes equal quantities of H and D. The results indicate that the mode of transport of hydrogen in the Nanosil membrane was atomic, which was different from that in the original Vycor material. The dissociation of molecular hydrogen by highly dispersed silica to form surface OH groups has been reported at temperatures as low as 393–473 K.

TABLE 3

$H_2$-$D_2$ exchange experiments for porous glass and Nanosil membrane

| Temp (K.) | mass 1/ mass 2 | mass 3/ mass 4 |
|---|---|---|
| 873 | 0.72 | 0.57 |
| 898 | 0.73 | 0.55 |

TABLE 3-continued $H_2$-$D_2$ exchange experiments for porous glass and Nanosil membrane

| Temp (K.) | mass 1/ mass 2 | mass 3/ mass 4 |
|---|---|---|
| 923 | 0.72 | 0.55 |
| 948 | 0.71 | 0.55 |
| 973 | 0.72 | 0.57 |
| 873 | 0.74 | 0.98 |
| 898 | 0.73 | 0.85 |
| 923 | 0.73 | 0.79 |
| 948 | 0.72 | 0.80 |
| 973 | 0.73 | 0.89 |

Figure 4:
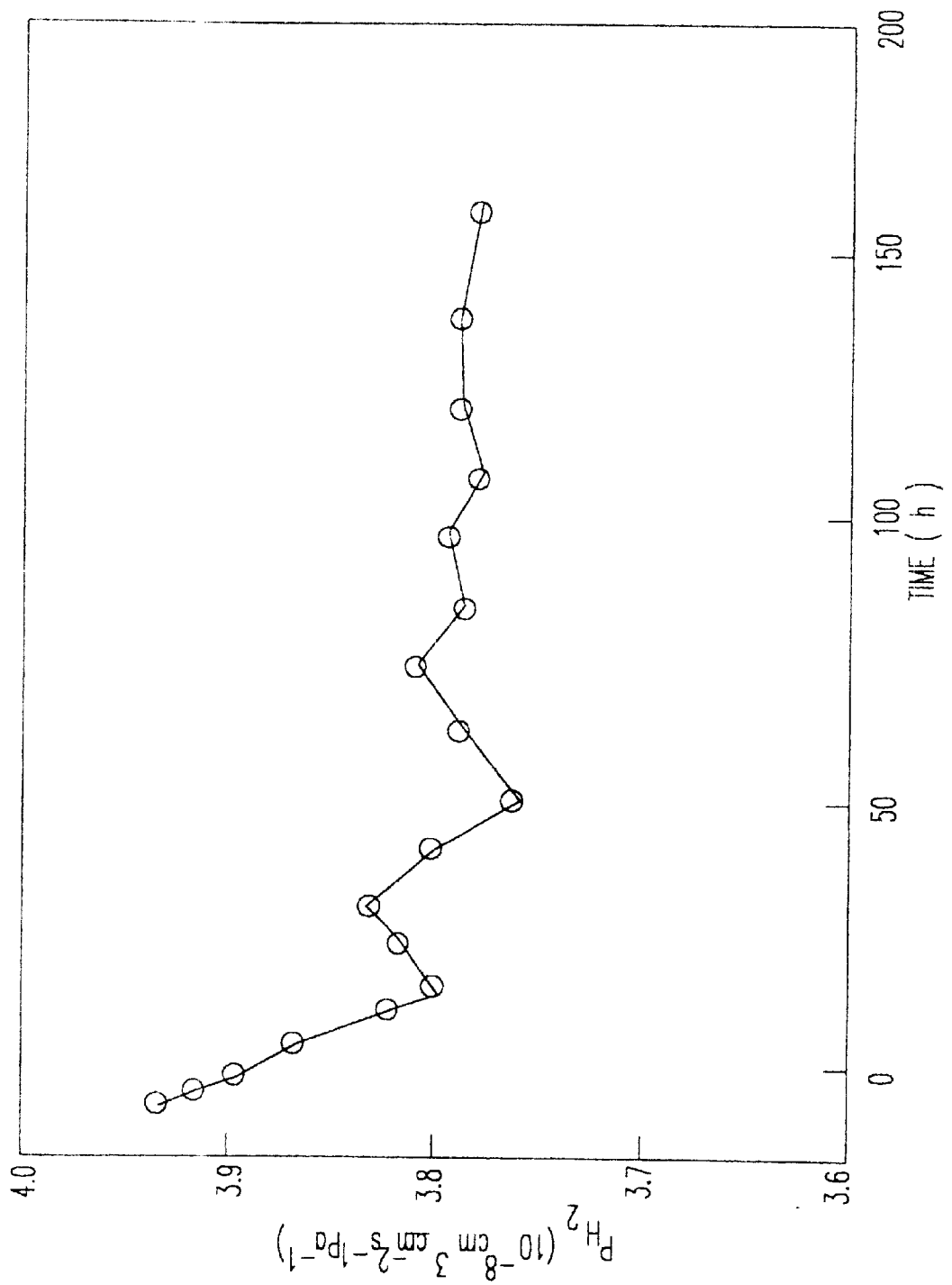
FIG. 4 is a stability plot for the Nanosil membrane on exposure to moisture (10% $H_2O$ in Ar) at 873 K.

For hydrothermal stability tests, the reactor was heated to 873 K in Ar, followed by introduction of water (to makeup 10% $H_2O$ in Ar) through a syringe pump (Orion, Model 3418). The membrane was maintained at this temperature for over 120 h. Permeability data was measured by stopping the moisture introduction, allowing 0.25 h to flush the system, introducing $H_2$, and determining the permeance. The results are shown in FIG. 4. All researchers have reported a substantial lowering of permeability (>50%) of silica modified membranes on exposure to moisture. FIG. 4 shows the stability plot for the Nanosil membrane on exposure to moisture (10% $H_2O$ in Ar) at 873 K. There was only a 4% drop in permeability in the first 12 h with no further drop in permeability for up to 120 h. Thus, the Nanosil membrane can be distinguished from other membranes by its stability.

In order to compare the Nanosil membrane, the subject of the present invention, to other membranes reported in the literature, a wide variety of the latter were prepared using published techniques. This included membranes made by the sol-gel, polymerization, silica sol, and decomposition methods.

In a first example, the sol-gel method was reproduced from the work of Kitao et al. (Gas separation by thin porous silica membrane prepared by sol-gel and CVD methods, Materials 61 & 62(1991)267) and involved the preparation of three solutions, A, B, and C with TEOS, $H_2O$ and $HNO_3$ in the ratio 1:10:0.1, 1:50:0.05 and 1:100:0.005 respectively. Polymer A was obtained by boiling solution A for 0.33 h and polymer B by boiling solution B for 0.16 h. Solution C was used as prepared. A Vycor tube (with ends capped with stoppers to prevent coating the inside of the tube) was dipped successively in A, B, and C and wiped to remove excess gel from the tube, washed with distilled water, dried at 473 K for 2 h (=1 K min$^{-1}$) and calcined at 723 K for 1 h. The process of dipping and heating was repeated several times.

Figure 5:
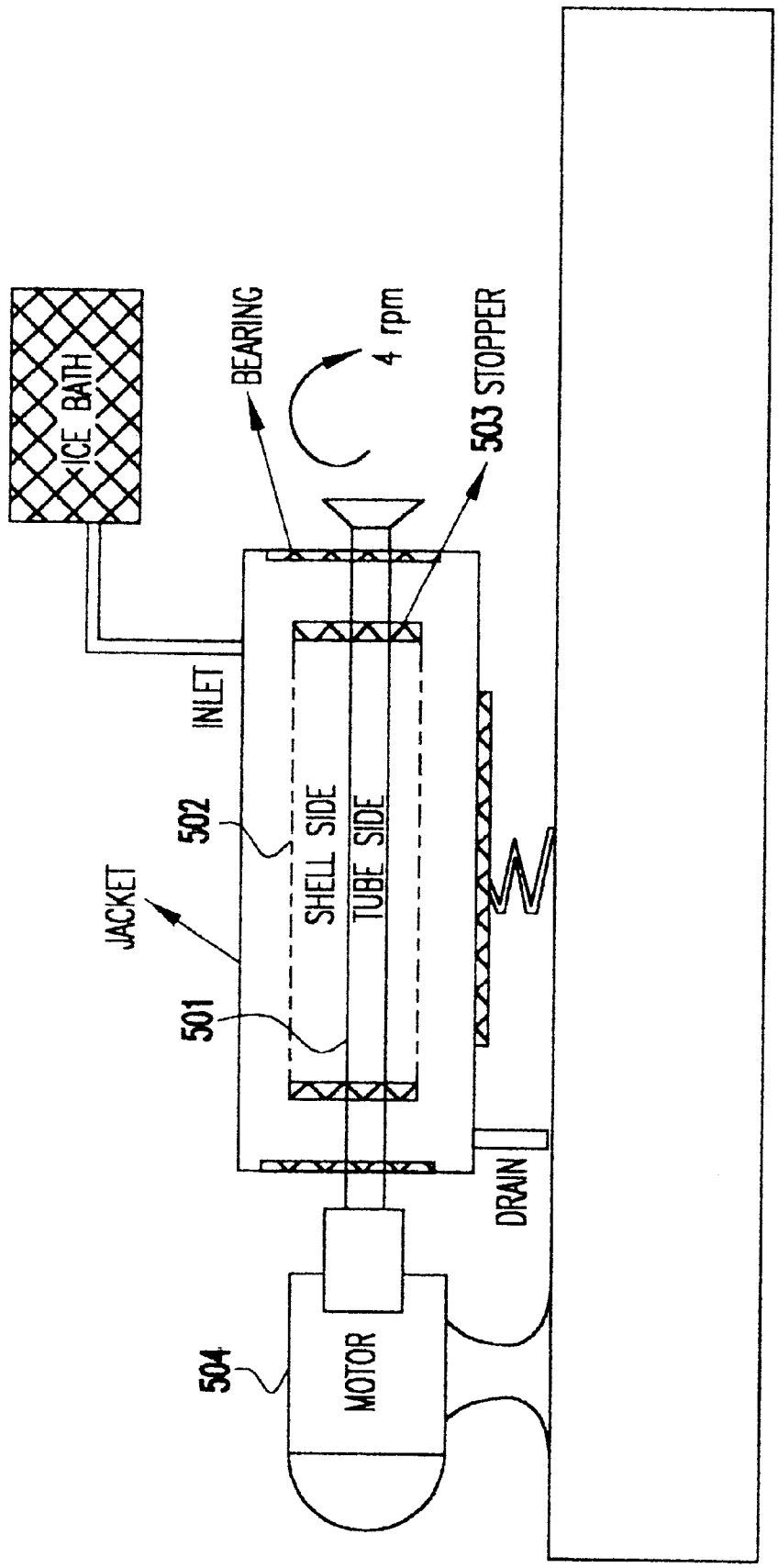
FIG. 5 is a schematic showing the experimental apparatus used in the polymerization of a silica precursor.

In a second example, the polymerization of a silica precursor, as adopted from Li (Preparation and characterization of silicon based inorganic membrane for gas separation, Ph.D. dissertation, University of Cincinnati, Cincinnati (1991)), involves the polymerization of a silica precursor, trichloromethylsilane (Aldrich 97%) within the pores of the Vycor tube. The shell 502 and tube 501 sides were isolated from each other using stoppers 503 and mounted as shown in FIG. 5. The membrane section (outer tube 501 side) was wrapped with absorbent tissue and held together with elastic bands. A solution prepared by diluting 2.8 cm$^3$ of ammonia solution (Fisher, 29.9% assay) with 12.2 cm$^3$ of H$_2$O, was injected in the shell 502 side while simultaneously 15 cm$^3$ of trichloromethylsilane was injected in the tube side. The assembly was rotated using a motor 504 at 4 rpm while being maintained at 265 K using a constant temperature bath (prepared by dissolving NaCl in ice+water). After 10 h, the inner tube was removed, dried in O$_2$ for 12 h at 343 K, followed by heating to 693 K and maintaining this temperature for 8 h.

In a third example, a silica sol processing method was adopted from de Lange (Microporous sol-gel derived ceramic membranes for gas separation, Ph.D. dissertation, University of Twente, The Netherlands, 1993), which involved refluxing a solution of TEOS, H$_2$O, C$_2$H$_5$OH, and HNO$_3$ (in the ratio 1:1:26:11.76) at 353K for 2 h. A sample of the solution was diluted with C$_2$H$_5$OH (1:18) and the membrane dipped (with ends sealed to prevent the solution from coating the inner side of the tube) for a few seconds. It was then dried at 393 K for 3 h and calcined at 673 K for 3 h. The dipping was repeated a second time with the dilution being 1:180.

In a fourth example, the decomposition of TEOS was reproduced from the work of Okubo and Inoue, Introduction of specific gas selectivity to porous glass membranes by treatment with tetraethoxysilane, *J. Membr. Sci*, 42 (1989) 109. The method was similar to the description of the present invention except that the TEOS was decomposed at a low temperature (473 K). The TEOS was also introduced through a bubbler at room temperature using Ar (3 $\mu$mol s$^{-1}$) as the carrier gas, but was premixed with O$_2$ (5 $\mu$mol s$^{-1}$) to facilitate the decomposition of TEOS at the lower temperature. The TEOSAr-O$_2$ stream was introduced on the tube side and was allowed to flow for 80 h after which the reactor was cooled in Ar.

Figure 6:
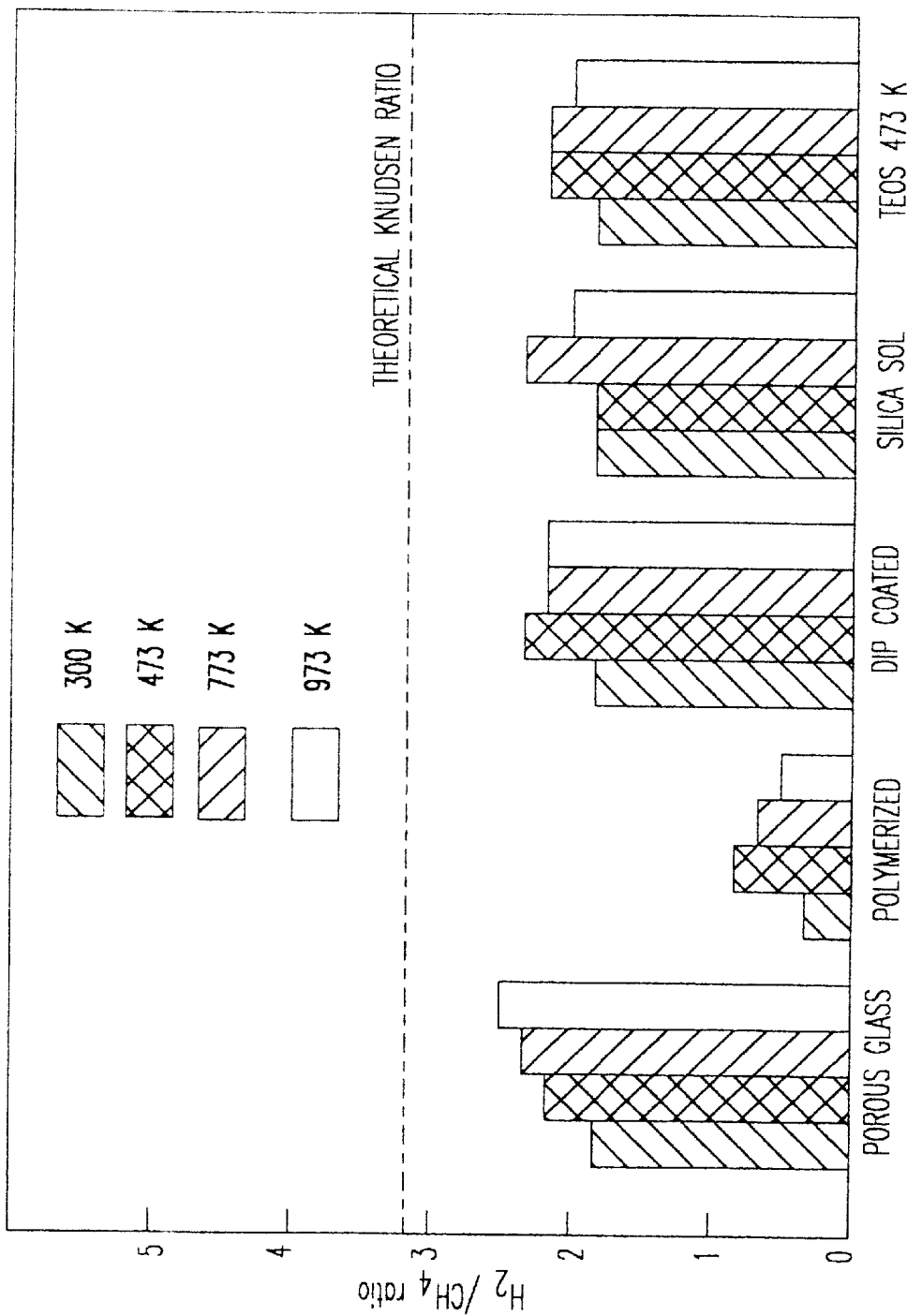
FIG. 6 is a bar graph comparing $H_2/CH_4$ separation ratios for different membranes.

The porous glass membrane modified by the various methods described above was tested for permeability. FIG. 6 compares the H$_2$/CH$_4$ separation ratios for the membranes prepared by the modification of the original porous glass membrane by polymerization, dip coating, silica sols and decomposition of TEOS (at 473 K). There was no enhancement in selectivities by modifying the porous membrane by any of these methods (compare to table 2). The H$_2$ permeabilities were at or lower than the permeability of the original support material. It was also observed that the membranes would often fracture during thermal treatment particularly, those made by the sol-gel and silica sol methods. Also, with silica sol processing and polymerization, it was extremely difficult to ensure repeatability due to the inherent nature of these processes.

The membranes described in this invention were characterized by N$_2$ physisorption conducted in a volumetric unit (Micromeritics ASAP 2000) using 0.4–0.6 g of the sample. The procedure involved dosing the sample with N$_2$ and determining the amount adsorbed for different relative pressures P/P$_o$ (P=pressure of nitrogen above the sample, P$_o$=vapor pressure of liquid nitrogen). This process was conducted until P/P$_o$~0.99 to obtain the adsorption isotherm. The desorption isotherm was obtained by retracing the above steps. A total of 156 points was used to obtain the adsorption desorption isotherms. The Barrett, Joyner and Halenda (BJH) method was used to determine the pore size distribution from the desorption isotherm (because of the fact that the desorption curve represents the thermodynamically stable adsorbate).

Figure 7:
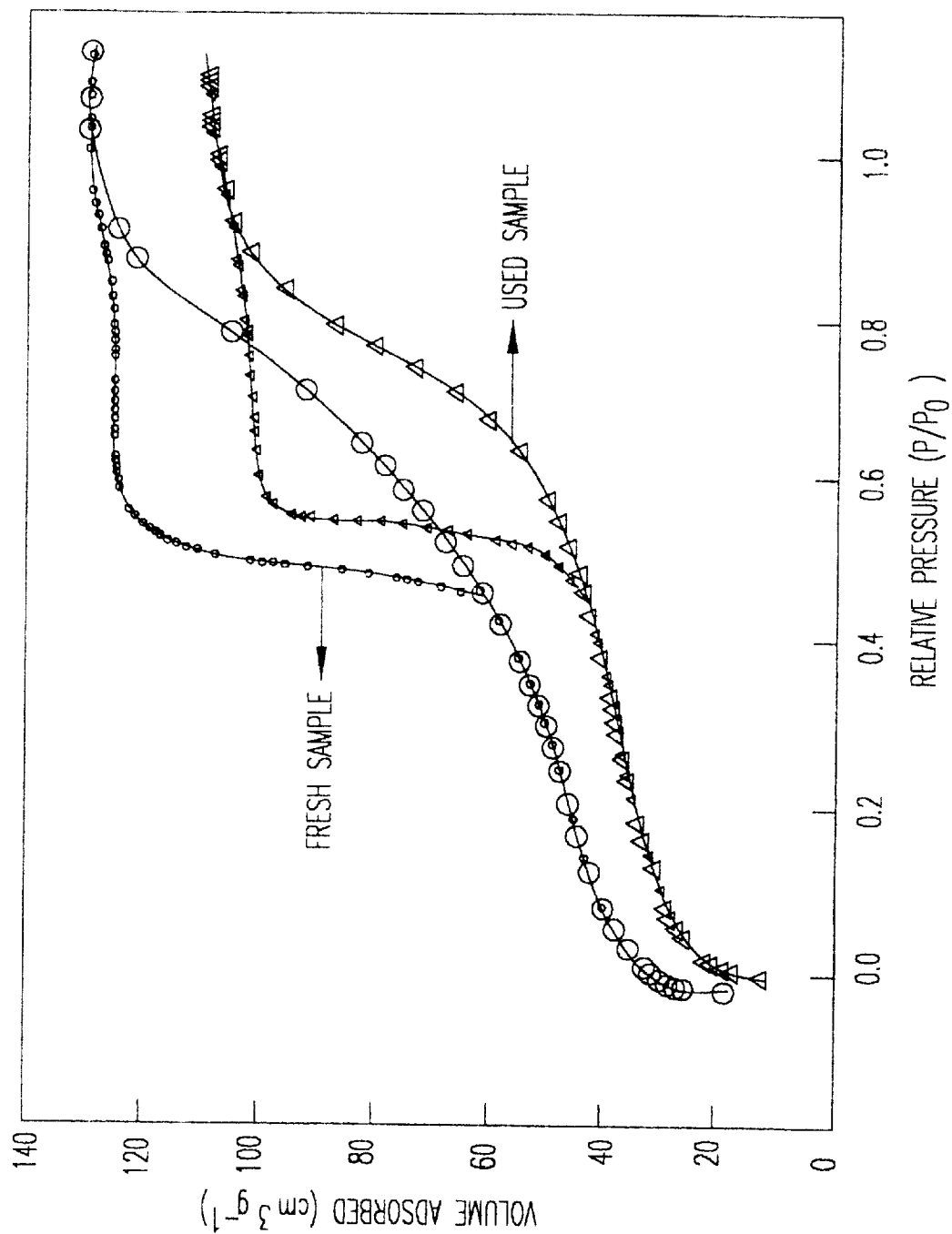
FIG. 7 is a graph showing the adsorption and desorption isotherms for fresh and used samples of the membranes of the present invention.
Figure 8:
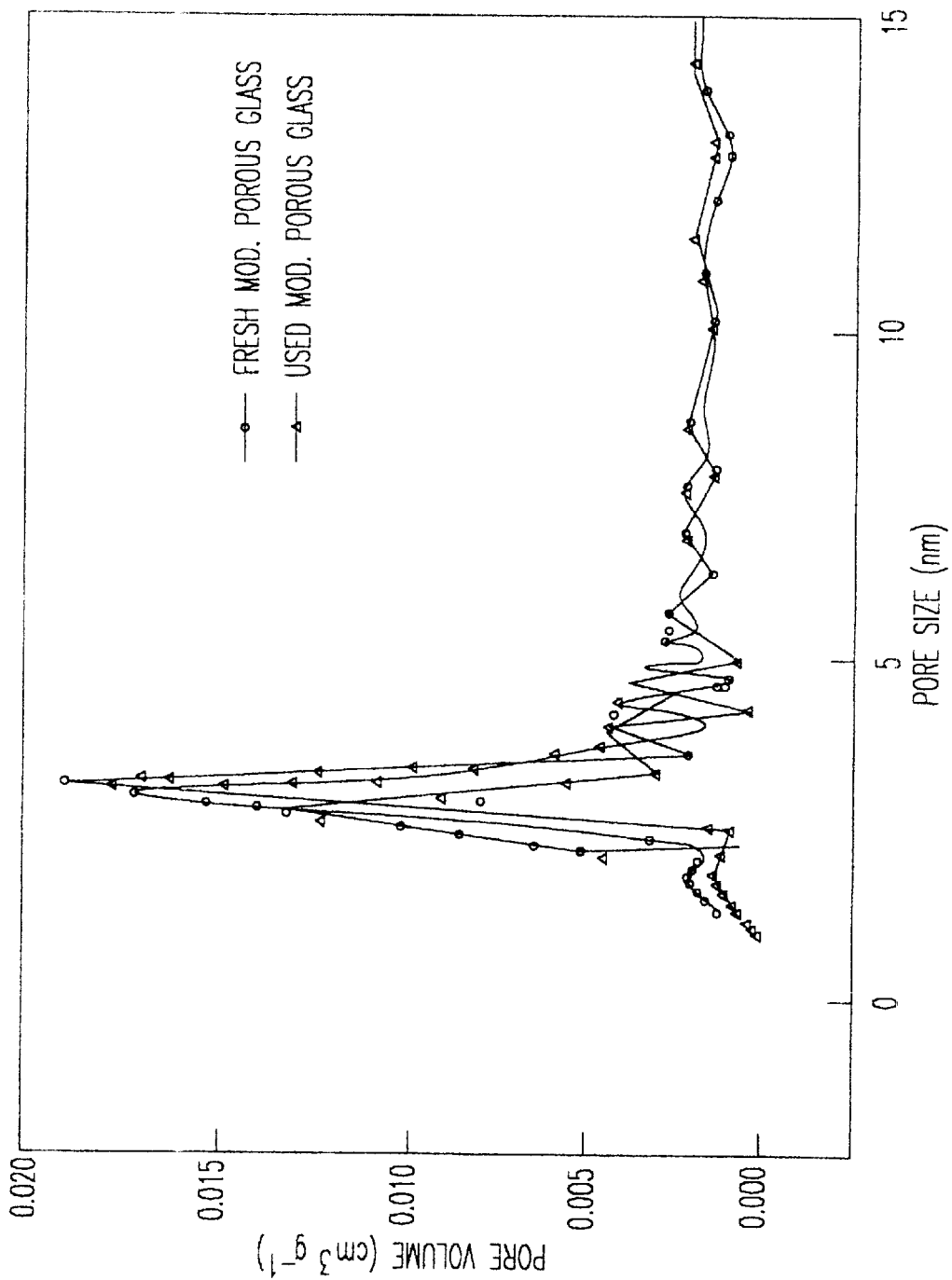
FIG. 8 is a graph of the pore size distributions of the untreated Vycor glass and the Nanosil membrane.

The results of characterization of the Nanosil membrane by experiments are shown in FIG. 7 which shows the adsorption and desorption isotherms for the fresh and used Nanosil samples. The isotherms obtained were similar to those obtained for the porous glass samples. The used sample however, indicated shrinking of the total pore volume since the total area encompassed by the used sample was smaller than that of the fresh sample. However, as is evident from FIG. 8, there was no appreciable change in the pore size for both the samples (pore size of 3.6 nm).

Figure 9:
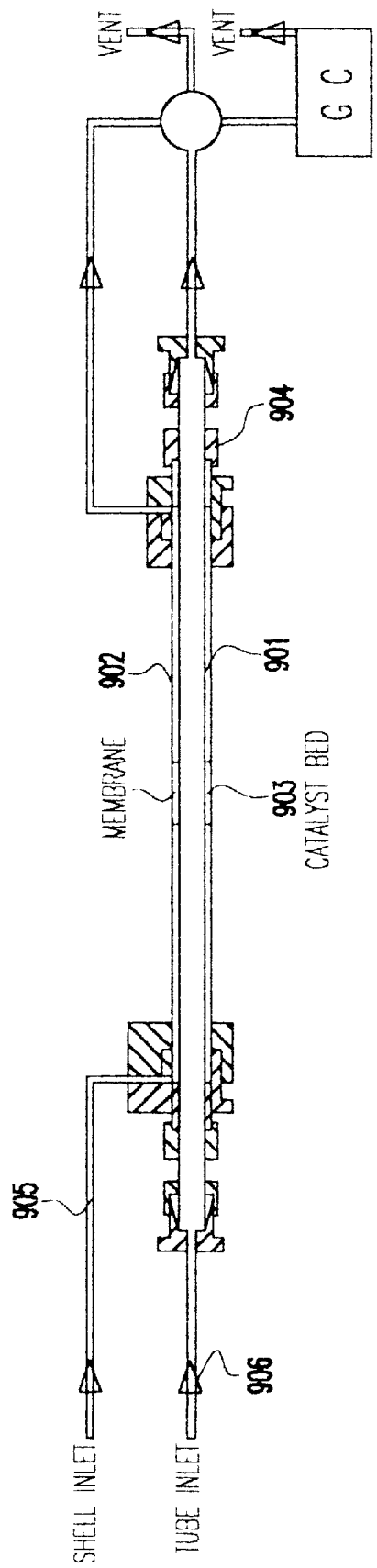
FIG. 9 is a schematic of the experimental apparatus used in the catalyst reactivity studies.

FIG. 9 shows the reactor used for the catalysis studies which was of a concentric shell 901 and tube 902 type with a central 4 cm catalyst bed 903 packed on the shell 902 side. The nominal diameters of the outer 902 and inner 901 tubes were 16 mm and 10 mm respectively, with a thickness of 1 mm. For use in membrane experiments, a quartz tube with a central 4 cm porous glass section (glass blown to the tube) was incorporated. The ends of the reactor were sealed with Swagelock fittings 904 equipped with lines for introducing feed gases and removing products. Inlet flow was controlled using mass flow controllers (not shown) (Brooks model 5850E) and shell and tube side pressures were monitored using pressure gauges (not shown). All reactant gases were purified using Drierite and molecular sieve filters before use. The inlet 905 to the shell side was a mixture of Ar, CH$_4$ and CO$_2$. Ar was also introduced in the tube side inlet 906 as a sweep gas (only for membrane experiments). The central part of the reactor was heated using a furnace.

The catalyst used in the studies was a standard Rh/Al$_2$O$_3$ sample of nominal 0.8 wt. % loading prepared by the incipient wetness technique using 0.11 g of RhCl$_3$3H$_2$O (99.9% Alfa-Aesar) dissolved in 6.1 cm$^3$ of distilled water and 4.97 g of Al$_2$O$_3$ (Aluminumoxide C, Degussa, calcined to 1173 K). The mixture was dried at 383 K (=0.008 K s$^{-1}$, 2 h soak) and calcined at 723 K (=0.008 K 54, 3 h soak) in a muffle furnace (NEY, Vulcan 3-550). The catalyst was pelletized and sieved to 30/120 mesh (0.6–0.12 mm). The specific surface area (Sg) of the catalyst and support (Al$_2$O$_3$) was determined using a five-point N$_2$ BET (Brumauer, Emmett, and Teller) analysis and the number of active sites was obtained by titrating with CO. X-ray diffraction (XRD) was used to characterize the bulk structure of the fresh and spent catalysts.

Tables 4 and 5 provide results from physisorption and chemisorption measurements for the 1% Rh/Al$_2$O$_3$ catalyst. The BET surface area measurements indicated a high surface area for the alumina support. Surface areas decreased moderately after reaction. The number of active sites was determined by titrating with CO. The value of 60 $\mu$mol g$^{-1}$ for the fresh sample corresponded to a dispersion of 72%, while the value of 48 $\mu$mol g$^{-1}$ for the spent sample indicated a dispersion of 58%.

TABLE 4

Nitrogen Physisorption results

| Sample | Weight % | $S_g$ (before reaction) ($m^2 g^{-1}$) | $S_g$ (after reaction) ($m^2 g^{-1}$) |
|---|---|---|---|
| $Al_2O_3$ | 0 | 99 | 87 |
| $Rh/Al_2O_3$ | 1 | 91 | 74 |

TABLE 5

CO chemisorption results

| Sample | Weight % | Reduction Temperature (K.) | Uptake (Before Reaction) ($\mu mol\ g^{-1}$) | Uptake (After Reaction) ($\mu mol\ g^{-1}$) |
|---|---|---|---|---|
| $Al_2O_3$ | 0 | 723 | 0.0 | 0.0 |
| $Rh/Al_2O_3$ | 1 | 723 | 60 | 48 |

A typical experimental procedure involved mixing 0.5 g of catalyst (30/120 mesh) with an appropriate amount of quartz chips (30/120 mesh) to make up the 4 cm bed on the shell side. The ends of the reactor were then sealed with the fittings. After checking for the absence of leaks, the catalyst was heated to 723 K in Ar flow (27 $\mu$mol s$^{31\ 1}$), reduced in $H_2$ (24 $\mu$mol s$^{-1}$ for 0.5 h, and then heated to the reaction temperature with only the Ar flow. The feed consisting of $CH_4$ (24 $\mu$mol s$^{-1}$), $CO_2$ (24 $\mu$mol s$^{-1}$), and Ar (27 $\mu$mol s$^{-1}$) was then introduced and the exit gas concentration was analyzed online using a gas chromatograph (SRI 8610B) (to obtain flow rate in cm$^3$ min$^{-1}$, multiply flow in units of $\mu$mol s$^{-1}$ by 1.5). The analysis was conducted periodically until the $CH_4$ conversion indicated a steady-state value. The process was then repeated for different temperatures. In the case of the membrane reactor, both the shell and tube side exit streams were mixed before sampling by the GC.

The dry reforming reaction (1) of methane with carbon dioxide is highly endothermic and two moles of reactants produce four moles of products. Hence, the reaction is favored by high temperatures and low pressures. The stoichiometry of (I) indicates that the expected $H_2/CO$ ratio in the product stream to be 1.0. Experimentally, this ratio was less than 1.0 and can be attributed to the occurrence of the reverse water-gas shift reaction, RWGS (2), $$CO_2 + H_2 = CO + H_2O\ \Delta H^0_{298} = 41\ kJ\ mol^{-1} \quad (2)$$

in parallel with the methane reforming reaction. Several studies have acknowledged the presence of the RWGS reaction. Here, the effect of the RWGS reaction has been considered in calculating the reactant conversions. A mole balance table was constructed assigning $X_1$ to be the conversion of $CO_2$ (and hence $CH_4$) from equation (1) and $X_2$ to be the conversion of $CO_2$ from equation (2). The values for $X_1$ and $X_2$ were obtained from the exit gas concentrations measured by the GC. As will be presented, a complete carbon balance was obtained.

Reactivity experiments were conducted in the fixed-bed reactor to determine the stability and activity of the $Rh/Al_2O_3$ catalyst. Table 6 compares $CH_4$ and $CO_2$ conversions from experimental data with theoretical equilibrium conversions. The conversions obtained in the fixed bed reactor were at or close to thermodynamic equilibrium levels. The catalyst was stable for tens of hours of operation and did not exhibit coking. Indeed, the carbon balance closed within experimental error (±2%). Noble metals have generally been reported to provide coke-free operation during methane reforming. Further experiments were conducted in the membrane reactor configuration using porous Vycor glass as the membrane.

TABLE 6

Equilibrium conversions (1 wt. % $Rh/Al_2O_3$)
Flow Rates: $CH_4$ = 24 $\mu$mol s$^{-1}$,
Ar = 27 $\mu$mol s$^{-1}$,
$CO_2$ = 24 $\mu$mol s$^{-1}$

| Temp (K.) | $CH_4$ Conv. (%) | $CO_2$ Conv. (%) | Theoretical $CH_4$ Conv. (%) | Theoretical $CO_2$ Conv. (%) | $\Sigma C_{out}/\Sigma C_{in}$ |
|---|---|---|---|---|---|
| 923 | 62.6 | 73.2 | 62.5 | 73.0 | 0.97 |
| 948 | 70.2 | 80.0 | 70.0 | 79.6 | 0.96 |
| 973 | 76.8 | 85.4 | 76.6 | 84.9 | 0.99 |
| 998 | 82.3 | 89.3 | 82.0 | 88.9 | 0.96 |
| 1023 | 86.5 | 92.1 | 86.3 | 91.6 | 0.98 |

Figure 10:
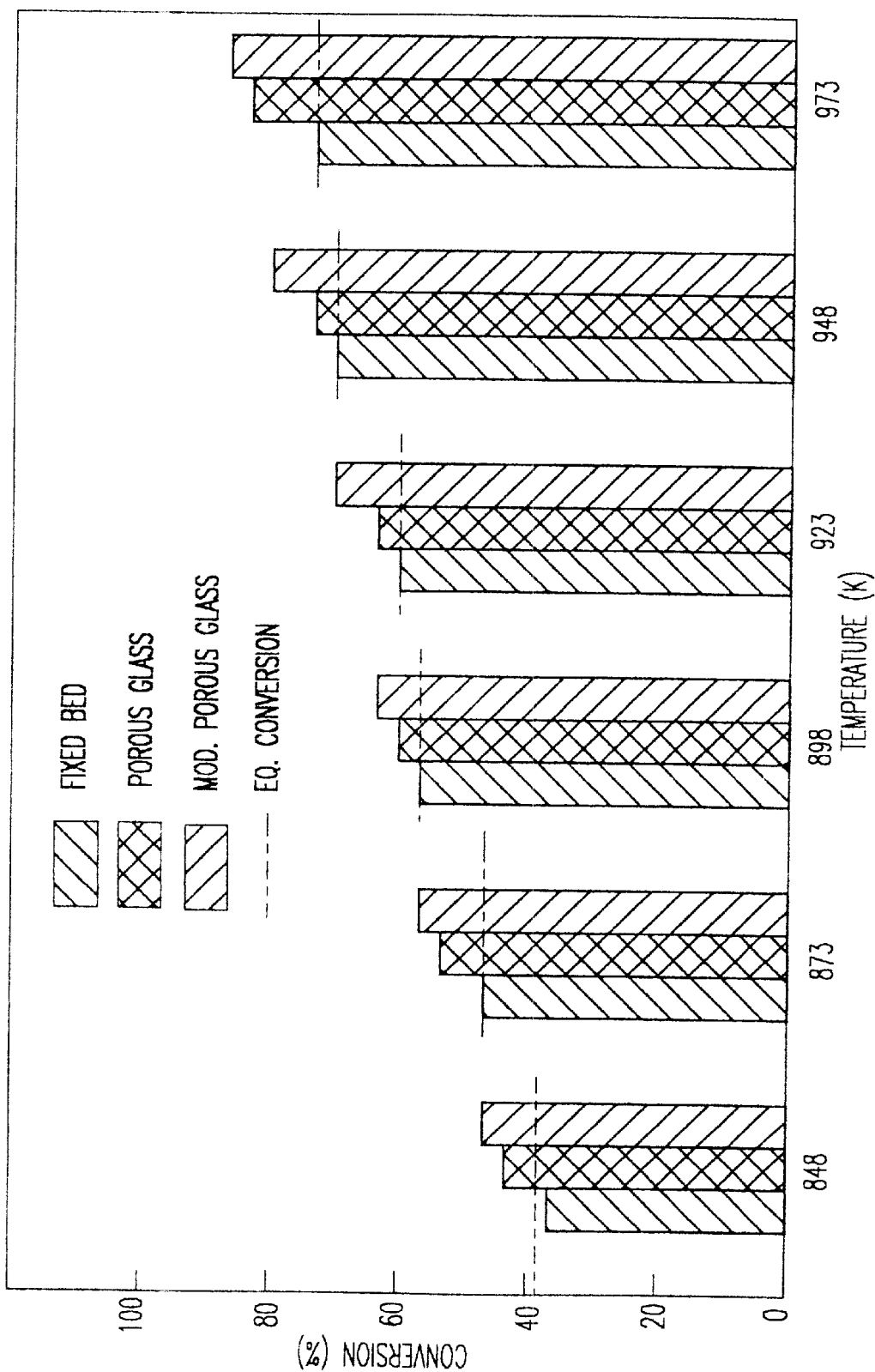
FIG. 10 is a bar graph comparing the methane conversions in three reactor configurations.

FIG. 10 compares the methane conversions in the three reactor configurations: fixed-bed, porous glass membrane, and Nanosil membrane. Both the membrane configurations provided methane conversions that were higher than equilibrium conversion levels. The Nanosil membrane reactor however, provided conversions higher than the Vycor reactor configuration. Experimental observations indicated that $H_2$ separation by the Nanosil membrane was comparable to the porous glass membrane with the added advantage of providing almost 190% pure $H_2$ separation.

While the invention has been described in terms of a single preferred embodiment, those skilled in the art will recognize that the invention can be practiced with modification within the spirit and scope of the appended claims. In particular, the method of preparation which involves the deposition of a thin layer of silica over a porous glass substrate (e.g., Vycor) should be applicable to any porous substrate such as alumina, titania, zirconia, or zeolite by themselves or in combination with each other or other supports such as anodized alumina or stainless steel or other metal filters. Also, the reaction studied in the present example is that of the dry reforming of methane to produce a mixture of $H_2$ and CO. However, any reaction that produces $H_2$ should be enhanced by using the membrane of this invention. The silica coatings of this invention, which are formed in an inert atmosphere lacking oxygen or steam, are preferably thin (e.g., on the order of 10–100 Å) such that the support retains a high permeability.

Having thus described our invention, what we claim as new and desire to secure by letters patent is as follows:

1. A filter selective to hydrogen comprising:
a porous material; and
a coating of silica on said porous material, said coating of silica is formed from a silica precursor decomposed in an inert atmosphere, said filter having a selectivity for hydrogen with respect to gases selected from the group consisting of carbon monoxide, carbon dioxide and methane in excess of 6,700.

2. A filter as in claim 1 wherein said porous material is selected from the group consisting of borosilicate glass with boron removed, alumina, titania, zirconia, zeolite, any substance that is stable to high temperature, and any combination thereof.

3. A filter as in claim 1 wherein said porous material is borosilicate glass with boron removed.

4. A filter as in claim 1 wherein said silica precursor is selected from the group consisting of alkoxides of silicon including tetraethyl silicates and tetra isopropyl silicates, chlorosilanes including chloro-, dichloro-, and trichloromethyl silanes, and other silicon compounds.

5. A filter as in claim 1 wherein said porous material has a pore size ranging from 30 Å to 1 micron.

6. A filter as in claim 5 wherein said coating of silica is thin such that the filter retains a permeability that is substantially the same as a permeability of said porous material without said coating of silica.

7. A filter as in claim 1 wherein said coating of silica is thin such that the filter retains a permeability that is substantially the same as a permeability of said porous material without said coating of silica.

8. The filter of claim 1 wherein said porous material with said coating of silica has a selectivity for hydrogen of 23000 to 27000 for $H_2/CH_4$ from 473 K to 973 K, respectively, 72000 to 82000 for $H_2/CO$ from 473 K to 973 K, respectively, and 6700 to 8200 for $H_2/CO_2$ from 473 K to 973 K, respectively, and has a permeability of no more than 4% reduced relative to a permeability of said porous material without said coating of silica.

9. The filter of claim 1 wherein the permeability of hydrogen is greater than $3 \times 10^{-8}$ $cm^3(STP)cm^{-2}s^{-1}Pa^{-1}$.

10. A method of making a filter comprising the step of coating a porous material with silica by decomposing a silica precursor in an inert atmosphere and depositing silica formed from said silica precursor onto said porous material in a manner whereby said filter having a selectivity for hydrogen with respect to gases selected from the group consisting of carbon monoxide, carbon dioxide and methane in excess of 6,700.

11. The method of claim 10 wherein said porous material is selected from the group consisting of borosilicate glass with boron removed, alumina, titania, zirconia, zeolite, any substance that is stable to high temperature, and any combination thereof.

12. The method of claim 11 wherein said porous material has a pore size ranging from 30 Å to 1 micron.

13. The method of claim 12 wherein said coating step produces a coating of silica that is thin such that filter retains a permeability that is substantially the same as a permeability of said porous material without said coating of silica.

14. The method of claim 10 wherein said silica precursor is selected from the group consisting of alkoxides of silicon including tetraethyl silicates and tetra isopropyl silicate, chlorosilanes, including chloro-, dichloro- and trichloromethyl silanes, and other silicon compounds.

15. The method of claim 10 wherein said inert atmosphere lacks oxygen and steam.

16. The method of claim 10 wherein decomposing said silica precursor is performed thermally.

17. A method as recited in claim 10 wherein said coating step produces a coating of silica that is thin such that the filter retains a permeability that is substantially the same as a permeability of said porous material without said coating of silica.

18. The method of claim 10 wherein said coating step is performed in a manner wherein said porous material with said coating of silica has a selectivity for hydrogen of 23000 to 27000 for $H_2/CH_4$ from 473 K to 973 K, respectively, 72000 to 82000 for $H_2/CO$ from 473 K to 973 K, respectively, and 6700 to 8200 for $H_2/CO_2$ from 473 K to 973 K, respectively, and has a permeability of no more than 4% reduced relative to a permeability of said porous material without said coating of silica.

19. The method of claim 10 wherein said inert atmosphere in said coating step is Argon.

20. The method of claim 10 wherein said coating step is performed without a vacuum pressure.

* * * * *